United States Patent

Kaibach et al.

[11] Patent Number: 5,941,668
[45] Date of Patent: Aug. 24, 1999

[54] SPREADING ANCHOR

[75] Inventors: Werner Kaibach, Buchloe; Stefan Raber, Kaufering, both of Germany

[73] Assignee: Hilti Aktiengesellschaft, Schaan, Liechtenstein

[21] Appl. No.: 09/132,020

[22] Filed: Aug. 10, 1998

[30] Foreign Application Priority Data

Aug. 16, 1997 [DE] Germany ............................ 197 35 709

[51] Int. Cl.⁶ .............................. F16B 13/04; F16B 13/06
[52] U.S. Cl. ............................ 411/60.2; 411/30; 411/57.1
[58] Field of Search .................................. 411/30, 31, 55, 411/57, 60, 61, 57.1, 60.2, 60.3

[56] References Cited

U.S. PATENT DOCUMENTS

| | | | |
|---|---|---|---|
| 3,200,692 | 8/1965 | Catlin | 411/30 |
| 4,702,654 | 10/1987 | Frischmann et al. | |
| 4,919,579 | 4/1990 | Miyanaga | |
| 4,968,200 | 11/1990 | Mark | |
| 5,314,278 | 5/1994 | Weber | |
| 5,332,346 | 7/1994 | Shinjo | 411/31 |
| 5,419,664 | 5/1995 | Hengesbach et al. | 411/61 |

FOREIGN PATENT DOCUMENTS

| | | | |
|---|---|---|---|
| 0627567 | 12/1994 | European Pat. Off. | |
| 1200083 | 7/1970 | United Kingdom | 411/31 |

Primary Examiner—Neill Wilson
Attorney, Agent, or Firm—Anderson, Kill & Olick, P.C.

[57] ABSTRACT

A spreading anchor including an anchor rod (2) having, at its one end, a cone-shaped head portion (3) widening in a setting direction and, at its opposite end, a load application element, the anchor further including a sleeve (5, 16) surrounding the anchor rod (2) and having at its end adjacent to the head portion (3), an expansion section (7, 17) formed of a plurality of expansion tabs (9, 18) separated from each other by axially extending slots (8), and extending form a plastic hinge (11) in a direction toward the head portion (3), the expansion tabs (9) expanding radially upon relative displacement of the sleeve (5, 16) and the head portion (3), and the expansion tabs (9) having convexly curved, in the direction toward the head portion (3) free front edges (10, 19), with convexly curved free front edges (10, 19) of the expansion tab (9) forming, in a completely expanded position of the expansion tabs (9, 18), substantially arc sections of a circle (R).

7 Claims, 2 Drawing Sheets

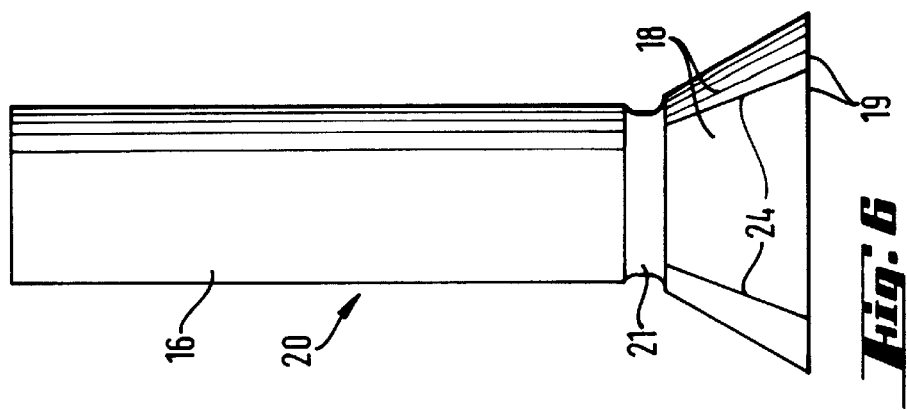
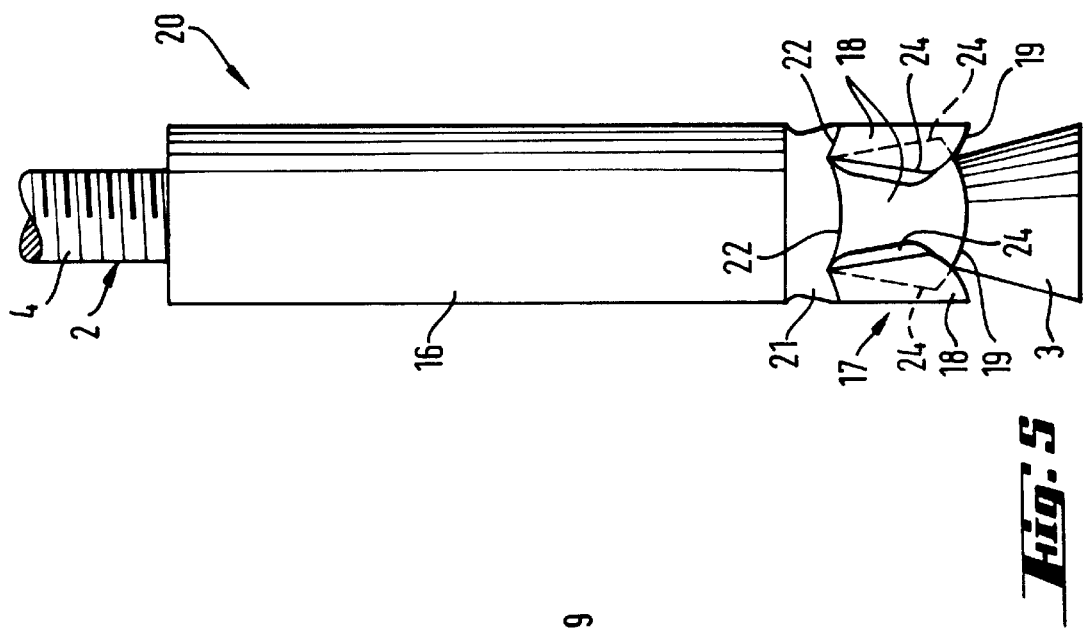
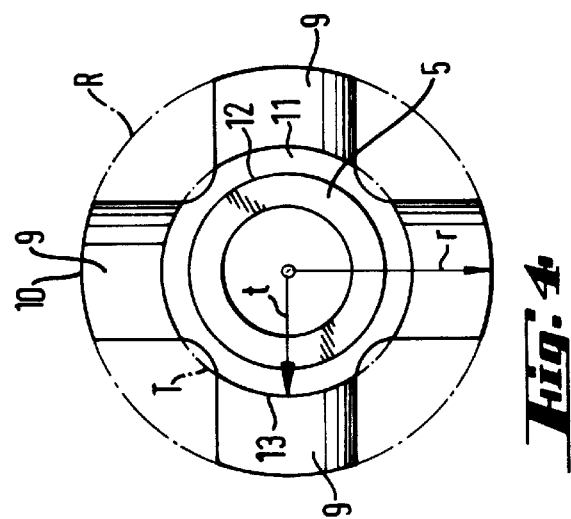

SPREADING ANCHOR

BACKGROUND OF THE INVENTION

1. Field of the Invention

The present invention relates to a spreading anchor and, in particular, to a spreading anchor to be set in a bore having an undercut, and including an anchor rod having, at its one end, a cone-shaped head portion and, at its opposite end, load application means, and a sleeve surrounding the anchor rod and having, at its end adjacent to the head portion, an expansion section formed of a plurality of expansion tabs separated from each other by axially extending slots and extending from a plastic hinge in a direction, toward the head portions, with the expansion tabs expanding radially upon relative displacement of the sleeve and the head portion.

2. Description of the Prior Art

In anchoring technology, it is often necessary to form connections which are expansion pressure-free to the greatest possible extent. In particular, with small edge and axis distances, the anchoring with conventional expansion dowels or anchors can result in fracture or even in stratification of the subsoil or the ground. To prevent this, there are provided anchoring systems in which a special connection or anchoring element is form-lockingly anchored in a receiving bore. To this end, a cylindrical receiving bore is provided at a predetermined depth with an undercut. An anchoring element, which is inserted in the pre-formed bore, includes an anchor rod provided with a cone and extending through an axial through-bore of a sleeve. The sleeve is provided with expansion segments or tabs which swung out, upon relative displacement of the sleeve and the anchor rod, and engage in the undercut.

For forming an undercut, different special undercut-cutting tools are used which are equipped with circumferential cutters which are eccentrically arranged in the receiving bore and which remove, by milling or shaving, a material at a predetermined depth of the receiving bore to expand the bore to a desired dimension at this depth. Spreading anchors, which automatically form an undercut during a setting process, are also known. To this end, the radially expanding expansion tabs are provided with cutters which chisel an undercut during a pure axial setting process or which mill the undercut when the sleeve is rotated upon being axially displaced. An example of the later-mentioned type of a spreading anchor is disclosed in U.S. Pat. No. 4,702,654. The known undercut-selfcutting spreading anchor has an anchor rod with a core and a sleeve with expansion tabs which is axially displaced relative to the anchor rod. The expansion tabs extend from a plastic hinge in a direction toward the core, which is provided at the front end of the anchor rod, and are equipped with cutting inserts provided on outer surfaces of the expansion tabs. During mounting or setting of this spreading anchor, the anchor rod is supported on the bottom of the receiving bore. The sleeve is rotatably displaced over the core, and the expansion tabs radially expand, with the cutting inserts forming an undercut in the wall of the receiving bore.

The known spreading anchors, which are designed for setting in a bore with and undercut such as, e.g., disclosed in U.S. Pat. No. 4,702,654, include sleeves with radially expanding expansion tabs which have, in a side view, a substantially rectangular contour. After the setting process, the radially expanded expansion tabs cover only a portion of an undercut surface formed in a bore of a structural component. This is particularly noticeable with the free front edges of the expansion tabs, which extend at a substantially right angle and which leave free a larger portion of the circular contour of the undercut. The front edges of the expansion tabs, which extend substantially perpendicular to the radius of the undercut and engage the outer contour of the undercut with their free corners. Therefore, a relatively large portion of the undercut remains unused for load transmission. Also, at the opposite end of the expansion tabs, in the region of the plastic hinge, there exist an incongruity between the abutting surface of the expansion tabs and the undercut surface of the undercut in an expanded position of the expansion tabs. Because of only partial use of the undercut surface, the achievable load values are smaller than those which were possible based on radial expansion of the undercut.

Accordingly, an object of the present invention is to eliminate the drawbacks of the know spreading anchor. Another object of the present invention is to provide a spreading anchor which would insure a better use of the available undercut surface of the undercut for load transmission and which would permit, thereby, to achieve better load values.

SUMMARY OF THE INVENTION

These and other objects of the present invention, which will become apparent hereinafter, are achieved by providing a spreading anchor including an anchor rod having at its one end, a cone-shaped head portion widening in a setting direction, and, at its opposite end, load application means. The anchor further includes a sleeve surrounding the anchor rod and having, at its end adjacent to the head portion an expansion section formed of a plurality of expansion tabs separated from each other by axially extending slots. The tabs extend from a plastic hinge in a direction toward the head portion and expand radially upon relative displacement of the sleeve and the head portion. The free front edges of the expansion tabs are convexly curved in the direction toward the head portion, with the convexly curved free front edges of the expansion tabs forming, in a completely expanded position of the expansion tabs, substantially arc sections of a circle.

The free front edges of the expansion tabs, which are formed according to the present invention, do not extend any more as secants to the circular contour of an undercut but follow this contour to a most possible extent. Thereby, the expansion tabs extend further into the undercut and provide for better use of the available undercut surface for load transmission. Therefore, at the same load, local compressive stresses of structural component are reduced or, alternatively, at the same local stresses, the allowable load can be increased.

It is advantageous when the circle, which is formed by convexly curved front edges of the completely radially expanded expansion tabs substantially corresponds to a circular outer profile of an undercut formed in a spreading anchor-receiving bore.

With this, a particular good adaptation of the geometry of the expansion tabs to the geometry of the undercut is insured. The expansion tabs extend up to the transition region between the undercut surface and a substantially axially extending bordering wall of the undercut and are supported in a radial direction. The thereby increased rigidity of the system proved to be favorable for dynamic loading of an attachment point.

A particular good correspondence between the geometry of the expansion tabs and an undercut is achieved when the convexly curved front edges of the expansion tabs form a contour which is substantially defined by ellipse equation $$x^2/a^2 + y^2/b^2 = 1$$

wherein a=r and b=r Sin (α), where r is a radius of an undercut formed in a transitional region between an undercut surface of the undercut and substantially axially extending bordering wall, and α is a half of a medium cone angle of the head portion.

A medium half of the cone angle is selected in order to take into account the use of a head portion the cone angle of which changes in the setting direction and which angle can be particular large as, e.g., is the case when the head portion has a trumpet-like shape.

The geometrical correspondence of the expansion tabs to the undercut can be further improved with the regions of the expansion tabs adjoining the plastic hinge being adapted to the geometrical ratios of the tabs in the expanded position. To this end, the border lines, which are formed by rear ends of the expansion tabs and define a circumferential groove formed on the outer surface of the sleeve, are so curved in the longitudinal direction of the expansion tabs that they form, in the expanded position of the expansion tabs, a circle.

With the circle, which is formed by the rear ends of the completely radially expanded expansion tabs having a radius t with h≦t≦1.25h and, preferably, h≦t≦1.15h, where h is a radius of the outer surface of the sleeve, the transition region between the plastic hinge and the expansion tabs lies in the transition region between the wall of a receiving wall and the undercut surface. Because the plastic hinge is formed by a groove formed in the sleeve outer surface, the transition edges of the structural element are located in the free space formed by plastic hinge-forming groove. The anchor sleeve does not impart any pressure to this weak region of the structural material, whereby the property of the material of the structural component are improved.

For a better use of the available undercut surface for the transmission of the load and to provide for a uniform stress of the material of a structural component, it is advantageous when adjacent tabs overlap each other at least along a portion of their longitudinal extent in their unexpanded position. The overlapping of longitudinal sides of the expansion tabs increases from the plastic hinge toward the convexly curved front edges of the expansion tabs and diminishes upon radial expansion of the expansion tabs. By selecting an appropriate overlapping in the unexpanded condition of the expansion tabs, it is insured that the expansion tabs, in their completely expanded condition, extend along a greatest possible portion of the undercut surface. Due to the use of a larger portion of the undercut surface, the loading with the greatest allowable surface pressure takes place only at a higher load. Because the overlapping of the adjacent expansion tabs increases toward their curved front edges, the increase of the radius of curvature of the head portion of the anchor road toward its front end is taken into account. Correspondingly, the longitudinal edges of the adjacent expansion tabs move away from each other, during the radial expansion of the tabs, to a greater degree at the free ends of the expansion tabs than at their regions adjacent to the plastic hinge. The increased, toward the free ends, overlapping of the expansion tabs compensates the greater movement of the longitudinal sides of the expansion tabs from each other along their axial extent.

It is particularly advantageous when the expansion tabs adjoin each other, in their completely radially expanded position clearance-free to a most possible extent, and the overlapping of the adjacent expansion tabs is eliminated. With this geometrical arrangement of the expansion tabs, the width of slots between adjacent tabs equals zero. The expanded expansion tabs form a closed surface which completely covers the undercut surface. This permits to use the entire undercut surface for transmission of a load.

The sleeve of the spreading anchor according to the present invention can be particularly easy produced when it is formed as a bent sheet metal stamped part. In this case, the necessary contour of the expansion tabs and of the plastic hinge can be obtained relatively easily with the available manufacturing technology. The shape of the expansion tabs can be obtained by stamping. In case the expansion tabs need be widened at the sides, they can be additionally, e.g., rolled. The desired profile of the plastic hinge can be produced, e.g., by embossing.

The specific shape of the expansion tabs according to the present invention is advantageous for use in spreading anchors which are to be set in bores with an already formed undercut. But it is particularly suitable for undercut-selfcutting spreading anchors which produce an undercut during a setting process. To this end, the expansion tabs are equipped with cutters. During their radial expansion the expansion tabs form an undercut which correspond to the geometry of the expansion tabs to a most possible extent, with a greatest possible portion of the undercut surface being used for the load transmission.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 4 shows a plan view of the sleeve in the direction of arrow IV in FIG. 3;

FIG. 5 shows a side view of an another embodiment of spreading anchor according to the present invention in an expanded condition; and FIG. 6 shows a side view of the spreading anchor shown in FIG. 5 in its expanded condition.

DETAILED DESCRIPTION OF THE PREFERRED EMBODIMENT

Figure 3:
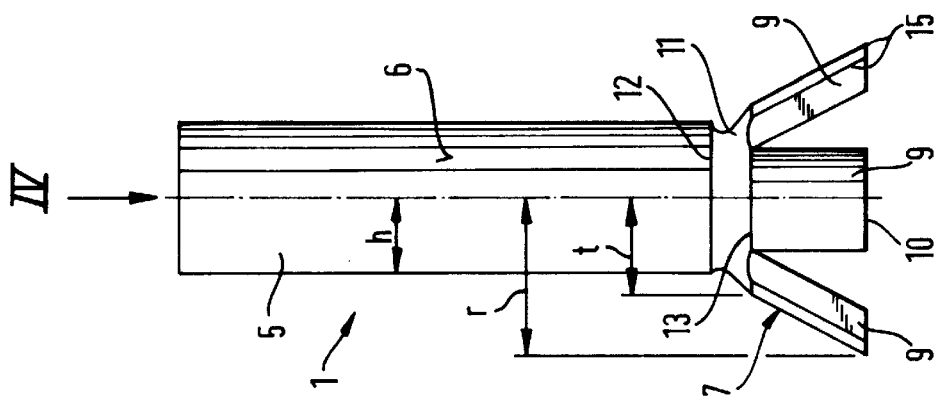
FIG. 3 shows a side view of the sleeve of the spreading anchor shown in FIG. 1 with the expansion tabs in their expanded condition.

FIGS. 1 through 4 show different views and conditions of a spreading anchor 1 according to the present invention. The spreading anchor 1 has an anchor rod 2 with a head portion 3 which is formed as a cone widening in a setting direction S. At its opposite end, the anchor rod 2 is provided with load application means 4, which is formed, e.g., as an outer thread. A sleeve 5 is displaceably supported on the anchor rod 2. The sleeve 5 has, in its region adjacent to the head portion 3, an expansion section 7 which is formed of a plurality of expansion tabs 9 separated by axially extending slots 8. The expansion tabs 9 extends in a direction toward the head portion 3 and form a plastic hinge 11 which is formed as a circumferential groove on the outer surface of the sleeve 5. The expansion tabs 9 expands radially upon displacement of the sleeve 5 in the setting direction S over the head portion 3. In case when the spreading anchor 1 is formed as an undercut-selfcutting anchor and forms an undercut in a bore in which it is set, cutters 15 can be provided on the free front edges 10 and/or longitudinal sides 14 of the expansion tabs 9. The cutters 15 can be formed as hard metal inserts located in outer walls of the expansion tabs 9 which form the expansion section 7 of the sleeve 5. The cutters 15 can be formed as hardened teeth or the like. In this respect, the spreading anchor 1 is similar to conventional undercut-selfcutting spreading anchor.

According to the present invention, the expansion tabs 9 are provided with convex, in the direction toward the head portion 3, front edges 10. As shown in FIG. 4, the curvature of the front edges 10 of the expansion tabs 9 is so selected that the contours of the front edges 10 form, in a completely radially expanded condition of the expansion tabs 9, arc sections of a circle R. The front edges 10 of the radially expanded expansion tabs 9, which form the arc sections 10, have a radius which corresponds substantially to the radius of an arcuate contour of an undercut formed in a receiving bore in the transitional region between the undercut surface and substantially axially extending bordering wall of the undercut.

Figure 2:
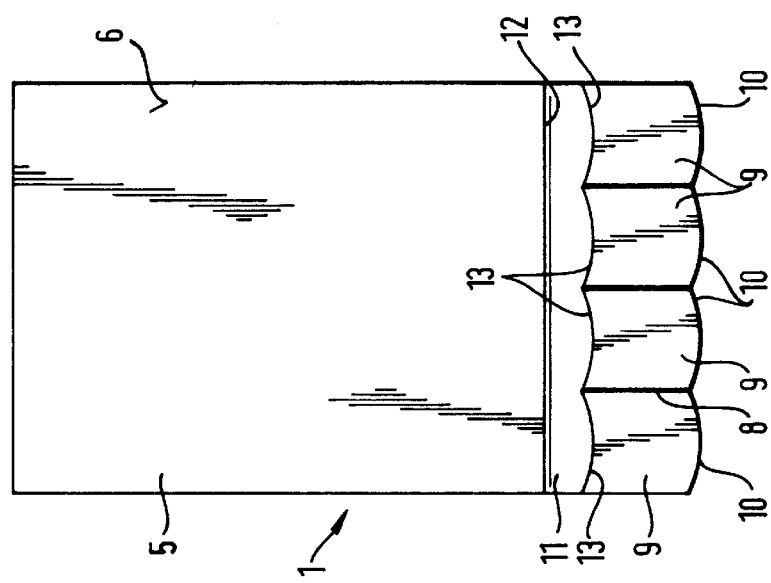
FIG. 2 shows a developed view of the sleeve of the spreading anchor shown in FIG. 1.
Figure 1:
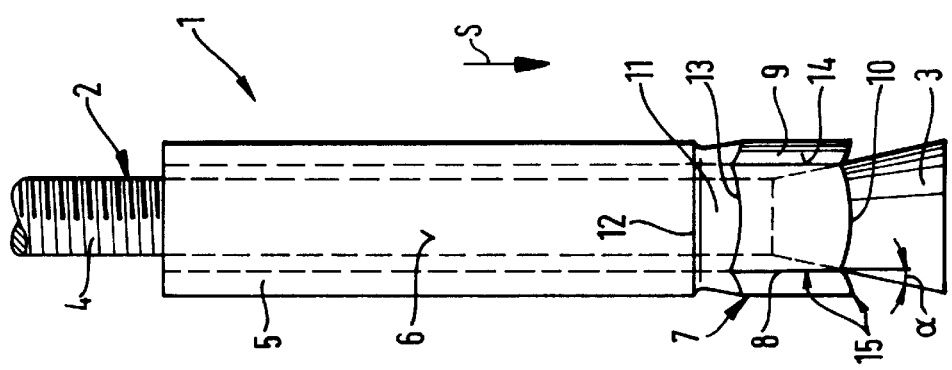
FIG. 1 shows a side view of a spreading anchor.

FIG. 2 shows a developed view of the sleeve 5 which is preferably formed as a bent sheet metal stamped part. The curved contours of the front edges 10 are clearly defined by the axial slots 8 which separate the expansion tabs 9. The contours of the expansions tabs 9 can be obtained, e.g., when the bent sheet metal sleeve 5 is stamped out. The necessary course of the front edges 10 of the expansion tabs 9 is determined from the equation of an ellipse $x^2/a^2+y^2/b=1$, where a=r, b=r.sin($\alpha$), wherein the r is a radius of the undercut which is formed in the transitional region between the undercut surface and the substantially axially extending wall of the undercut, and $\alpha$ is a half of the cone angle of the head portion 3.

FIG. 3 shows a side view of the sleeve 5 with expanded expansion tabs 9. In FIG. 3, the anchor rod 2 with its cone-shaped head portion 3 is not shown for better clarity. In the completely radially expanded position of the expansion tabs 9, the convexly formed front edges 10 represent, in the side view, a rectilinear contour which extends substantially perpendicular to the longitudinal axis of the sleeve 5.

As can be seen in FIGS. 1–4, the expansion tabs 9 are also modified in their connection region with the plastic hinge 11. In the complete radially expanded condition of the tabs 9, their rear border lines 13 also form arc sections of a circle T, as shown in FIG. 4. To this end, the border lines 13 of the expansion tabs 9 which form, in the outer surface 6 of the sleeve 5, a circumferential groove forming the plastic hinge 11, are convexly curved in the longitudinal direction of the expansion tabs 9. The radius t of the rear border line 13 of the expansion tab 9, which is formed as an arc of the circle T is equal to h≤t≤1.25h and, preferably, to h≤t≤1.15h, where h is a radius of the outer surface of the sleeve 5. The profile of the plastic hinge-forming nut can be obtained by, e.g., embossing when the sleeve 5 is formed as a bent sheet metal part. The second border line 12 of the circumferential hinge-forming groove is rectilinear, as shown in FIG. 2.

FIGS. 5 and 6 show a second embodiment of a spreading anchor according to the prevent invention. In FIGS. 5–6, the spreading anchor is generally designated with a reference numeral 20. In FIGS. 5–6, the elements identical with those shown in FIGS. 1–4, are designated with the same reference numerals. The spreading anchor 20, which is shown in FIGS. 5–6, distinguishes from the spreading anchor 1 shown in FIGS. 1–4, in the shape and arrangement of the expansion tabs 18 which form the expansion region 17 of the sleeve 16. As shown in FIG. 5, adjacent expansion tabs 18 overlap each other along their longitudinal sides 24. The portion of an expansion tab 18, which lies behind a respective portion of another expansion tab 18, is shown with dash lines in FIG. 5. The overlapping takes place from the plastic hinge 21 to the front edges 19 of the expansion tabs 18. To take this overlapping into account, the radius of curvatures of the head portion 3 increase toward the front end, and the longitudinal sides or edges 24 of the expansion tabs 18 are spaced from each other a different distance along their axial length upon displacement of the sleeve 16 over the head portion 3. The different spacing of the longitudinal sides 24 of the expansion tabs 18 is compensated by an increased overlapping of the longitudinal sides 24 toward their front edges. As shown in FIG. 6, with a suitable selection of the overlapping amount, in a completely radially expanded position of the expansion tabs 18, a closed cone outer surface is formed. The longitudinal sides or edges 24 are located adjacent to each other without any clearance. The convexly curved rear border lines 22 and the front edges 19 of the expansion tabs 18 form, in the completely expanded position of the expansion tabs 18, straight lines in the side view, which extend substantially perpendicular to the axis of the sleeve 16.

Though the present invention was shown and described with references to the preferred embodiment, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A spreading anchor, comprising an anchor rod (2) having, at one end thereof, a cone-shaped head portion (3) widening in a setting direction(s), and, at an opposite end thereof, load application means (4; and a sleeve (5, 16) surrounding the anchor rod (2) and having, at an end thereof adjacent to the head portion (3), an expansion section (7, 17) formed of a plurality of expansion tabs (9, 18) separated from each other by axially extending slots (8) and extending from a plastic hinge (11) in a direction toward the head portion (3), the expansion tabs (9) expanding radially upon relative displacement of the sleeve (5, 16) and the head portion (3), and the expansion tabs (9) having convexly curved, in the direction toward the head portion (3) free front edges (10, 19), the convexly curved free front edges (10, 19) of the expansion tab (8) forming, in a completely expanded position of the expansion tabs (9, 18), substantially are sections of a circle (R), wherein the circle (R), which is formed by convexly curved front edges (10, 19) of the completely radially expanded expansion tabs (9, 18) substantially corresponds to a circular outer profile of an undercut formed in a spreading anchor-receiving bore, and wherein the convexly curved front edges (10, 19) of the expansion tabs (9, 18) form a contour which substantially corresponds to an ellipse equation $$x^2/a^2+y^2/b^2=1$$

wherein a=r and b=r sin($\alpha$), where r is a radius of an undercut formed in a transitional region between an undercut surface of the undercut and substantially axially extending bordering wall, and α is a half of a medium cone angle of the head portion (3).

2. A spreading anchor according to claim 1, wherein the expansion tabs (9, 18) are provided with cutters (15) for forming an undercut in a spreading anchor-receiving bore.

3. A spreading anchor, comprising an anchor rod (2) having, at one end thereof, a cone-shaped head portion (3) widening in a setting direction(s), and, at an opposite end thereof, load application means (4; and a sleeve (5, 16) surrounding the anchor rod (2) and having, at an end thereof adjacent to the head portion (3), an expansion section (7, 17) formed of a plurality of expansion tabs (9, 18) separated from each other by axially extending slots (8) and extending from a plastic hinge (11) in a direction toward the head portion (3), the expansion tabs (9) expanding radially upon relative displacement of the sleeve (5, 16) and the head portion (3), and the expansion tabs (9) having convexly curved, in the direction toward the head portion (3) free front edges (10, 19), the convexly curved free front edges (10, 19) of the expansion tab (8) forming, in a completely expanded position of the expansion tabs (9, 18), substantially are sections of a circle (R), wherein the plastic hinge (11, 21) is formed by a circumferential groove formed in an outer surface (6) of the sleeve (5, 16), and wherein border lines (13, 22) of the circumferential groove, which are formed by rear ends of the expansion tabs (9, 18), are convexly curved in an axial direction of the expansion tabs (9, 18) and form, in the completely expanded position of the expansion tabs (9, 18), a circle (T).

4. A spreading anchor according to claim 3, wherein the circle (T), which is formed by the rear ends (13, 22) of the completely radially expanded expansion tabs (9, 18), has a radius (t) where $h \leq t \leq 1.25h$ and where h is a radius of an outer surface of the sleeve (5, 16).

5. A spreading anchor according to claim 4, wherein $h \leq t \leq 1.15h$.

6. A spreading anchor, comprising an anchor rod (2) having, at one end thereof, a cone-shaped head portion (3) widening in a setting direction(s), and, at an opposite end thereof, load application means (4; and a sleeve (5, 16) surrounding the anchor rod (2) and having, at an end thereof adjacent to the head portion (3), an expansion section (7, 17) formed of a plurality of expansion tabs (9, 18) separated from each other by axially extending slots (8) and extending from a plastic hinge (11) in a direction toward the head portion (3), the expansion tabs (9) expanding radially upon relative displacement of the sleeve (5, 16) and the head portion (3), and the expansion tabs (9) having convexly curved, in the direction toward the head portion (3) free front edges (10, 19), the convexly curved free front edges (10, 19) of the expansion tab (8) forming, in a completely expanded position of the expansion tabs (9, 18), substantially are sections of a circle (R), wherein adjacent expansion tabs (18) overlap each other at least along a portion of a longitudinal extent thereof in an unexpanded position thereof, and wherein the overlapping of longitudinal sides (24) of the expansion tabs (18) increases from the plastic hinge (21) toward the convexly curved front edges (19) of the expansion tabs (18), the overlapping diminishing upon radial expansion of the expansion tabs (18).

7. A spreading anchor according to claim 6, wherein the expansion tabs (18) adjoin each other, in the completely radially expanded position thereof, clearance-free to a most possible extent, and overlapping of adjacent expansion tabs (18) is eliminated.

\* \* \* \* \*